United States Patent
Hux et al.

(10) Patent No.: US 6,989,838 B2
(45) Date of Patent: Jan. 24, 2006

(54) METHODS, SYSTEMS, AND DATA STRUCTURES FOR GENERATING A RASTERIZER

(75) Inventors: William A. Hux, Portland, OR (US); Stephen Junkins, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 10/608,453

(22) Filed: Jun. 26, 2003

(65) Prior Publication Data

US 2005/0046628 A1    Mar. 3, 2005

(51) Int. Cl.
G09G 5/00    (2006.01)
(52) U.S. Cl. .................. 345/581; 345/522; 345/619
(58) Field of Classification Search ............... 340/7.55, 340/7.56; 345/418, 419, 501, 522, 530, 581, 345/619, FOR 111, 139, FOR 145, 151, 345/FOR 153, 506, 531
See application file for complete search history.

(56) References Cited

OTHER PUBLICATIONS

Segal, Mark et al., The OpenGL Graphics System: A Specificatin (Version 1.5)—see last entry of IDS dated Jun. 1, 2004.*

"ARM Assembler", http://msdn.microsoft.com/library/default.asp?url=/library/en-us/wcechp40/html/_armasm_assembler_manual.asp, 1 page.
"ARM Guide", Available at http://msdn.microsoft.com/library/default.asp?url=/library/en-us/wcechp40/html/ccrefarmguide.asp, 1 page.
"Hybrid OpenGL ES API Framework", http://www.hybrid.fi/main/esframework/index.php, 2 pages.
"Khronos Member Hybrid Graphics Delivers World's First OpenGL ES API Software Implementation", Press release, available at http://www.hybrid.fi/main/company/releases/Hybrid-pr-20040217_OpenGL_ES.pdf, (Feb. 17, 2004), 2 pages.
Segal, Mark, et al., "The OpenGL Graphics System: A Specification (Version 1.5)", Available at http://www.opengl.org/documentation/specs/version1.5/glspec15.pdf, (2003), 333 pages.

* cited by examiner

Primary Examiner—Matthew C. Bella
Assistant Examiner—G. F. Cunningham
(74) Attorney, Agent, or Firm—Schwegman, Lundberg, Woessner & Kluth, P.A.

(57) ABSTRACT

Methods, systems and data structures produce a rasterizer. A graphical state is detected on a machine architecture. The graphical state is used for assembling a shell rasterizer. The machine architecture is used for selecting replacement logic that replaces portions of shell logic in the shell rasterizer. The machine architecture is used for selectively inserting memory management logic into portions of the shell logic to produce a rasterizer.

25 Claims, 2 Drawing Sheets

METHODS, SYSTEMS, AND DATA STRUCTURES FOR GENERATING A RASTERIZER

TECHNICAL FIELD

Embodiments of the present invention relate generally to rasterizer applications, and more particularly to dynamically generating a rasterizer application for a desired graphical state.

BACKGROUND INFORMATION

Three-dimensional images (3D) can be rendered on an electronic display using two steps. The first step is for transforming a desired graphical state to pixel coordinates. The second step is for drawing lines connecting the coordinates and for filling a geometric structure represented by the connected coordinates with pixel data (attributes). A graphical state is a desired image that is to be rendered on the electronic display.

During the transformation step, two-dimensional (2D) space projected polygons are produced. Moreover, light source parameters are applied for producing vertex colors. These colors are typically stored in Red, Green, and Blue (RGB) formats.

The second step uses a rasterizer (application) for drawing and filling polygons within regions of the electronic display. The rasterizer takes 2D polygon and 2D vertex attributes as parameters. The attributes can include 2D position, depth dimension (Z), RGB vertex color (from a computation or manual input), 2D texture coordinates, and optionally a vertex alpha value. This alpha value is generally an 8 bit quantity stored with color values RGB for aligning to 32 bits.

Conventionally, rasterizers are embodied as large programming libraries or drivers residing on computing devices having sufficiently large storage and memory. This is so, because the number of possible graphical states that may need to be rendered by a rasterizer is very large. Therefore, in order to adequately account for all the possible graphical states of any processing rasterizer a large amount of logic needs to be available to the device that is rendering the graphical state within an electronic display.

However, this is a considerable waste of storage and memory on the device. As a result, a large variety of electronic devices which do not have sufficient storage or memory cannot benefit from robust rasterizer applications. Some of these devices include personal digital assistants (PDAs), cell phones, intelligent appliances, and others. Thus, conventionally these devices have extremely limited graphics capabilities.

Therefore, there is a need for improved implementations and techniques for providing improved rasterizers. These implementations and techniques should be tailored to the devices processing them in order to better use storage and memory, such that devices traditionally not capable of rendering advanced graphics can now enjoy robust imaging capabilities.

DESCRIPTION OF EMBODIMENTS

Novel methods, systems, and data structures for producing a rasterizer are taught. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
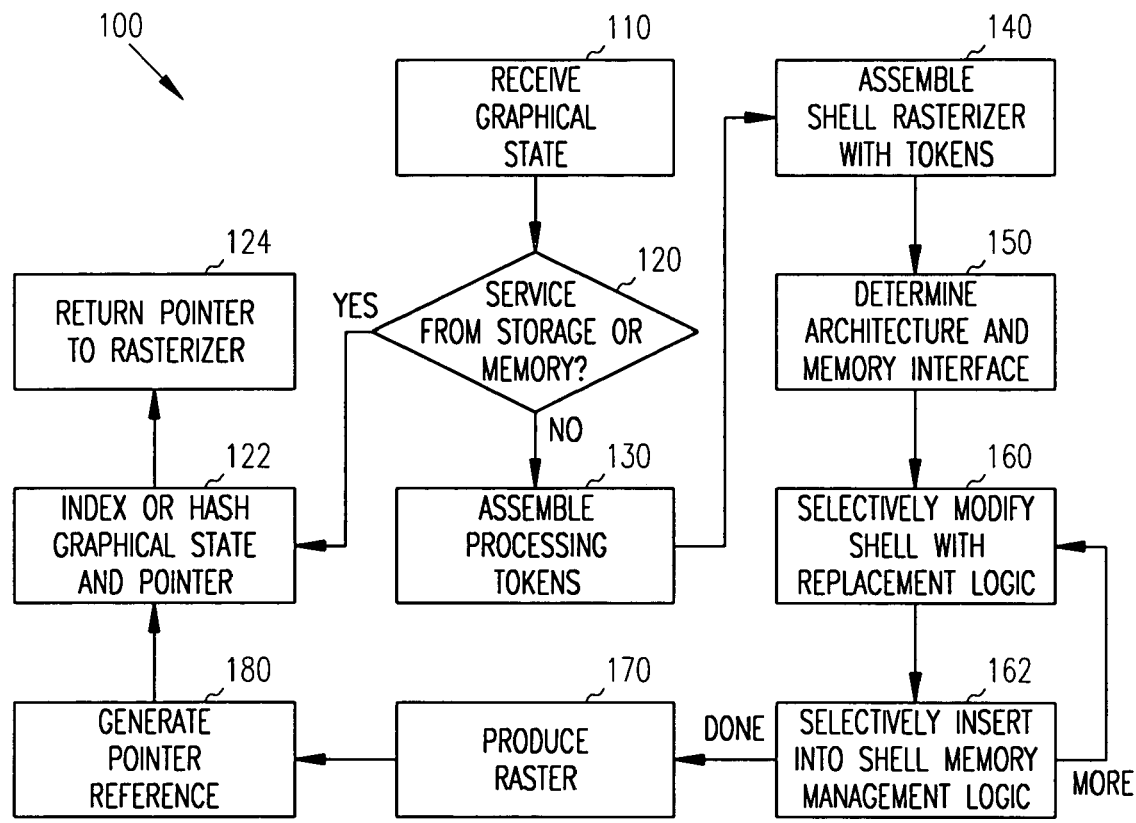
FIG. 1 is a flow diagram of a method for providing a rasterizer, in accordance with one embodiment of the invention.

FIG. 1 illustrates a flow diagram of one method 100 for providing a rasterizer, in accordance with one embodiment of the invention. By "rasterizer" it is meant a rasterizer application having software logic capable of being processed on a machine. Thus, the method 100 can be implemented in any microprocessor architecture. Moreover, the method 100 can be implemented in hardware, software, firmware, or in combinations of hardware, software, and firmware within or accessible to microprocessor architectures.

As will be demonstrated to one of ordinary skill in the art, in the description that follows, the method 100 dynamically produces a rasterizer in a novel manner, which results, when executed, in more efficient use of storage or memory on a processing machine. In contrast, existing and conventional rasterizers are statically determined, such that any given graphical state is predefined and preinstalled within a processing machine.

Thus, microprocessor architectures implementing embodiments of method 100 experience a decrease in space utilization. This is achieved without adversely impacting rasterizer performance or quality. This is a significant advantage over conventional techniques, since as microprocessor architectures become increasingly smaller in the industry; the ability to achieve quality image processing has become a growing concern.

Initially, a graphics application or system (e.g., DirectX Application Programming Interface (API), OpenGL API, and others) processing on a machine architecture makes a request for a graphical image to be drawn on an electronic display of a machine. The request is combined to produce an appropriate graphical state. The graphical state is a state that shows the relationship between attributes of the desired image with respect to any attributes for additional images, which may or may not be already present within the display. Thus, the graphical state is attribute information for the images as they will appear within the display once the desired graphical image is inserted into an existing state of the display.

For example, if a user is interacting with a 3D graphics application where the display already includes an image of a 3D cube and the user further desires a 3D oval to be overlaid onto the cube within the display, then the graphical state can be defined as a 3D oval superimposed on a 3D cube. In order to produce the desired image (3D oval superimposed on a 3D cube), the graphical state is mapped to a rasterizer that when executed is capable of producing the desired image.

Conventionally, all combinations of possible or permissible graphical states are predefined within a rasterizer driver and when a particular graphical state is required, the appropriate predefined rasterizer is acquired from storage or memory. This consumes excessive storage and memory resources of the processing machine, since all possible rasterizers need to exist before any particular graphical state is actually requested from a user. However, with teachings of the embodiments for this invention, a rasterizer is dynamically generated when needed from smaller building blocks of logic, which are assembled for producing rasterizers associated with multiple graphical state combinations. Therefore, a significant amount of storage or memory can be saved, and machines not previously capable of rendering quality images (e.g., PDAs, cell phones, intelligent appliance, and others) can benefit from quality image processing, which has been previously reserved only for machines with large storage and memory resources. This is achieved by permitting rasterizers to process on these machines, which have heretofore been incapable of processing a variety of rasterizers because of limited resources.

At 110, a graphical state is received from a graphics application. The graphics application sets a variety of image attribute variables needed to define the graphical state, such as depth buffer enablement (3D effects), depth buffer testing (less than, greater than, fixed), depth buffer write enablement, texture address mode (wrap, clamp, mirror), texture combine mode (no texture, modulate, add, replace, and others), texture type (16 pits per pixel, 24 bits per pixel, compressed, alpha (mapping from 8 to 32 bits), texture filtering (bilinear filter, point sampling, and others), alpha blending (blending source and destination colors), fog enablement (linear per pixel), and other desired image attributes. The image attributes and other attributes associated with an existing display state (e.g., having a pre-existing image or being in an initial state with no pre-existing images) are used for defining the appropriate graphical state.

Once the graphical state is received, a check is made at 120 to determine if a rasterizer is already available in memory or storage for generating the graphical state. In one embodiment, the graphical state is hashed or indexed at 122 into a data structure (e.g., table, list, or tree) to determine whether a pointer reference to the appropriate rasterizer already exists, and if so, at 124, the pointer is returned to the graphics application.

If a pre-existing rasterizer, which can produce the graphical state, is not available in storage or memory, then, at 130, the graphical state is represented as a series of processing tokens used for generating a shell rasterizer. This is achieved by scanning the graphical state's attributes or properties and inserting generic processing tokens at appropriate locations, these processing tokens identify the type of rasterizer processing needed to achieve portions of the graphical state (e.g., depth testing, modulation, texture processing, and others). For example, to identify the processing needed to satisfy a depth testing attribute, the following tokens can be generated:

Setup_DepthBuffer_16: moves a 16-bit depth pointer to the correct memory location for scanning;

DepthTest_16: loads the 16-bit depth value from a depth buffer;

ZTest_Less: compare current depth value to buffer value, using a logic operator (<);

DepthWrite_16: write the current depth value to the 16-bit buffer it the test passes; and DepthIncrement_16: increment the depth buffer memory pointer by an amount appropriate for a 16-bit depth buffer.

Of course a variety of other tokens, which are generically needed to satisfy a graphical state can also be used, and the above example for a depth test is presented for purposes of illustration only. One of ordinary skill in the imaging arts readily recognizes the various processing which occurs for achieving a particular image attribute or portion of the graphical state. Accordingly, all such processing expansion is included with the embodiments of this invention.

The graphical state becomes an ordered tokenized stream of processing logic having unique data values that are dictated by the needed image attributes of the graphical state. Once the processing tokens are known, generic rasterizer functions can be acquired from storage or memory that optimally perform the needed operations (based on properties or limitations of a machine architecture processing the method 100). Only a small subset of functions is needed to adequately process multiple combinations of graphical states. For example, a function can be used for flat (F) and smooth S (shading), texture (T); F, S, and T with Z (depth) testing; F and S with modulated T; FT (Flat Texture) and ST (smooth texture) with Z; and the like.

At 140, a rasterizer shell is assembled as a data structure that represents generic rasterizer functions having unique parameters (image attributes) needed for producing the graphical state. The generic rasterizer functions are represented as pointer references within the rasterizer shell where information about the pointers is available within the data structure. The information about the pointer can include byte lengths of the rasterizer functions, pointers to memory having the operational codes for the rasterizer functions, offset positions for inserting setup or initialization logic, offsets positions to insert internal looping logic, offset positions to insert logic into the lopping logic that executes conditionally if color is written successfully, offset positions to insert logic that consistently executes at the end of the looping logic, and others. Thus, the unique imaging attributes of the desired graphical state and template rasterizer functions are interfaced to one another using the rasterizer shell. The imaging attributes can be viewed as Meta data information associated with the template or generic rasterizer functions and is used to dynamically generate a specific rasterizer, which can be executed to produce the desired graphical state.

At 150, an architecture for a machine that will process a rasterizer generated by populating or instantiating the shell rasterizer is determined. Image processing can require different types of interpolation and translation depending upon whether an image is being rendered on a 32-bit machine versus a 16-bit machine, depending upon available Random Access Memory, depending upon the speed of underlying processors, depending upon the number of registers available to the processors, and the like. Thus, by determining the properties associated with a processing machine's architecture, customized logic for performing rasterizer operations and memory management can be developed and made available for dynamic insertion into the shell rasterizer.

Accordingly, at 160, depending upon the architecture, replacement logic is selected from a library of available functions that are accessible to the machine. This replacement logic is used with the shell rasterizer to populate the generic rasterizer functions with the needed image attributes, which when executed will optimally generate the desired graphical state (based on properties or limitations of a machine architecture processing the method 100). For example, if only 2 registers are available for processing a rasterizer on the machine and a generic rasterizer function needs 3 registers, replacement logic for the generic function or portions of the generic function can be acquired from a logic library accessible to the machine.

The replacement logic can also be represented as data structures including total number of operational codes, input registers needed, input registers used as scratch, the identity of the operational codes used, and others.

Some example replacement logic can include texture address computations for wrap, clamp, or mirror modes; depth-value fetching; depth-value comparisons; fog calculations; texture adding (instead of multiplying) for flat (F) rasterizer functions, texture adding (instead of multiplying) for smooth (S) rasterizer functions, and others. Of course, a variety of additional replacement logic can be implemented to perform rasterizer functions based on architectures for machines that will process a rasterizer consisting of one or more rasterizer functions. All such variations are intended to be included with embodiments of this invention.

In a similar manner, at 162, logic can also be inserted into the shell rasterizer, rather than replacing logic. Insertion logic (which adds logic rather than replacing logic) can also be represented as structures similar to replacement logic. Insertion logic is inserted into the shell rasterizer to manage memory more efficiently. Moreover, insertion logic can be inserted based on a simulated execution of the shell rasterizer. That is, if a prior rasterizer function included in the shell rasterizer pushes a needed variable to the execution stack, then the insertion logic can be intertwined within the shell rasterizer at the proper location to pop the needed variable from the stack at the processing location within the shell rasterizer where the variable is required.

In this way, memory usage within the shell rasterizer can be optimized to the architecture of the machine, which will process the shell rasterizer (by using memory interfaces and architectural limitations (properties) of the machine architecture). Further, each machine architecture includes its own API that can be used to interface to the execution stack. Thus, selective memory management logic is selectively inserted into the shell rasterizer based on the simulated execution of the shell rasterizer and the machine architecture that is used to actually execute the shell rasterizer.

Moreover, the shell rasterizer provides an automated facility or interface technique for passing image attribute values to generic rasterizer functions and modified generic rasterizer functions. This parameter passing technique includes pointers to generic rasterizer functions needed for processing a graphical state and image attribute values consumed by those functions that are passed via registers within the processing machine. Generic functions can also be altered based on a processing machine's architecture so that values expected in known (input) registers within the machine architecture may not be available when needed during shell rasterizer processing, so that scratch registers (scratch) may not be appropriately consumed or reused by the replacement or insertion logic.

However, in embodiments of this invention, register usage is tracked while the shell rasterizer is being altered with replacement and insertion logic. Correspondingly, memory management logic (stack functions) is (are) automatically and dynamically inserted into the shell rasterizer to ensure that input registers are available when needed and that scratch registers are optimally used based on the processing machine's architecture. In this way, some embodiments of this invention do not need to employ a full register allocation algorithm, although other embodiments can implement a full register algorithm.

At 170, after the shell rasterizer has been altered to include replacement logic and memory management logic, the shell rasterizer is produced as a dynamically generated rasterizer. The rasterizer is capable of being executed on a processing machine to efficiently produce a desired graphical state.

In some embodiments, at 180, a pointer reference to the rasterizer is generated. Furthermore, at 122, the desired graphical state can be indexed or hashed into a storage or memory data structure along with the pointer reference. Thus, when a graphics application makes a subsequent request for a previously processed graphical state, the graphical state is hashed or searched in the memory data structure to acquire the pointer reference. When the pointer reference is accessed, the previously dynamically generated rasterizer is processed to generate the graphical state. Therefore, various embodiments of this invention can be further optimized with memory caching techniques to improve rasterizer image rendering.

Embodiments for this invention permit rasterizer logic to be organized and processed within a machine more efficiently in order to render images on an electronic display. The small subsets are dynamically and selectively modified, organized, and augmented to produce individual instances of rasterizers, that when executed generate desired graphical states. As a result, less storage and memory are needed on a machine to generate quality image processing. Consequently, machine architectures that were previously incapable of rendering quality images can now produce quality images using only minimal memory resources.

Figure 2:
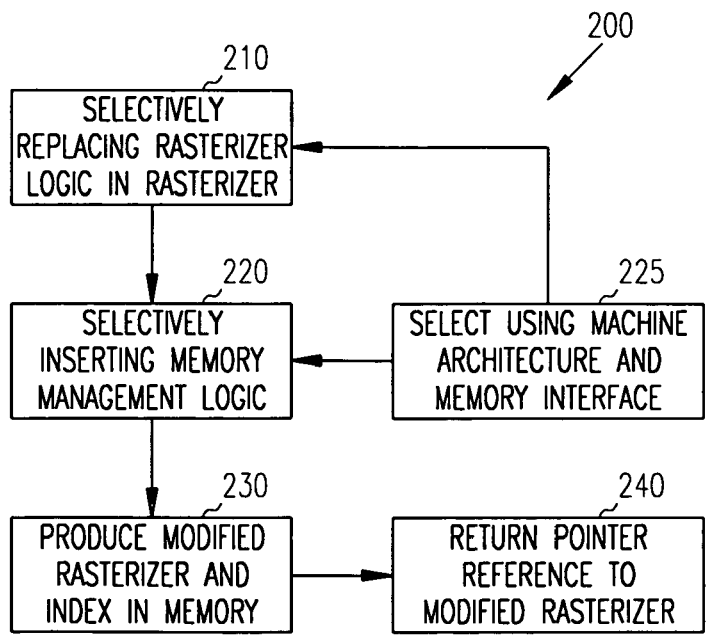
FIG. 2 is a diagram depicting another method for providing a rasterizer, in accordance with one embodiment of the invention.

FIG. 2 is a diagram depicting another method 200 for providing a rasterizer, in accordance with one embodiment of the invention. The rasterizer resides in a computer-accessible medium as a data structure that when accessed will execute in order to produce a desired graphical state on an electronic display of a processing machine. Thus, the method 200 can be implemented, installed, or enabled to processing on any microprocessor device.

Initially, a graphical state is requested from a graphics application interfaced to the method 200. The graphical state includes a variety of unique image attributes associated with a requested image that is to be drawn on the electronic display. The electronic display may also include zero or more already existing images. Each of any of these pre-existing images will also include a variety of image attributes or properties. Thus, the desired state of the display after effecting the changes defined in the desired image attributes against a pre-existing display state represents the graphical state.

The graphical state is received by the processing of the method 200. The graphical state is indexed or hashed within storage or memory for the processing machine to determine whether the graphical state has been previously processed and still has a dynamically generated rasterizer available within memory or storage of the processing machine. If a previously generated rasterizer does exist, then a reference to the pre-existing rasterizer is returned for immediate processing.

If a pre-existing rasterizer does not exist, then the graphical state is restated, re-expressed, expanded, or altered to be represented as a tokenized data stream. The tokens of the data stream represent rasterizer functions or logic that is needed to produce selective portions of the desired graphical state. For example, tokens can represent the processing steps that need to occur on the desired image attributes in order to produce a depth test.

Once the tokenized data stream of the desired graphical state is produced, a shell rasterizer is acquired from a logic or function library that includes the processing steps represented in the tokenized data stream. At this time, memory is also allocated within the processing machine for the shell rasterizer, which will become a modified rasterizer. The shell rasterizer includes one or more pointers to generic rasterizer functions which are needed to produce the desired graphical state. The shell rasterizer also includes the specific image attribute values needed by those generic functions to produce the desired image.

Next, a processing machine's architectural properties are acquired. Architectural properties can include number of available registers for processing rasterizers, available RAM, processing speed, and the like. Based on these attributes, the generic rasterizer functions may require modification to optimally and successfully produce a modified rasterizer from the shell rasterizer. For example, input and scratch registers may require alteration within portions of the logic of the generic rasterizer functions.

At 210, selective replacement logic for the generic rasterizer functions are determined by using the properties of the processing machine's architecture, depicted at 225. At 220 any needed memory management logic that is required by any inserted replacement logic is inserted to ensure proper and efficient memory management. The memory management logic uses the memory interface (memory management API) of the processing machine, depicted at 225. The memory management logic will update branches, execution stack, and needed memory for the shell rasterizer.

Each processing token defined in the tokenized data stream iterates through the processing at 210–225, until all processing tokens in the data stream have been addressed.

In one embodiment, the memory management logic keeps track of register usage depending upon simulated execution for the shell rasterizer. During this book keeping exercise, the memory management logic can generate logic that will push and pop data from an execution stack of the processing machine when the shell rasterizer executes as a modified rasterizer on the processing machine.

At 230, the shell rasterizer is completely modified as a new modified rasterizer that when executed produces the desired graphical state. Accordingly at 240, and in some embodiments, a pointer reference to the modified rasterizer is returned to the graphics application that requested the desired image. In one embodiment, the modified rasterizer is temporarily indexed or hashed within storage or memory of the processing machine, such that if a subsequent request is received for an image defined by the same graphical state, the appropriate rasterizer can be immediately returned for use. Indexing or hashing can occur by using the desired graphical state, which is associated as a unique entry in a memory data structure based on the indexing or hashing technique implemented. The data structure entry includes a record having a pointer reference to the modified rasterizer.

The replacement and memory management logic are small subsets of selective logic for rasterizer functions and for memory management, respectively. This logic can itself be represented as an API or library of routines within the storage or memory of the processing machine. The available shell rasterizers are generic rasterizer templates that are dynamically modifiable. Conversely, the replacement and memory logic are specific instructions designed to efficiently and properly use architectural resources of a designated processing machine. The processing of method 200 provides embodiments for dynamically modifying the shell rasterizers with selective replacement and memory logic using the image attribute values originally provided by a graphics application. The result is a dynamic modified rasterizer designed to generate a desired graphical state when executed by the processing machine. The modified rasterizer executes in a memory efficient manner within the processing machine.

Once the method 200 produces a modified rasterizer, any memory or storage required to produce the modified rasterizer is flushed on the processing machine (not shown in FIG. 2). In this way, all available memory or storage is available when the processing machine references and thereby executes the modified rasterizer.

It is now apparent how embodiments of the method 200 provide improved image memory management for processing machines. By improving and reducing memory resource requirements, rasterizer processing can occur on electronic processing machines, which have previously be incapable of performing such operations. As a result, smaller machines (e.g., PDAs, cell phones, intelligent appliances, and others) with minimal memory resources can enjoy the image processing experienced by larger machines.

Figure 3:
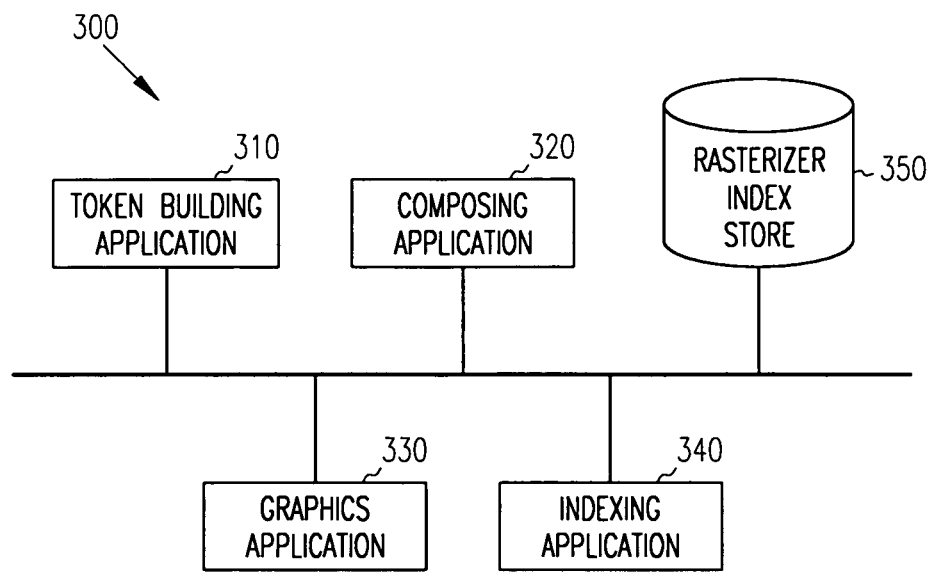
FIG. 3 is a diagram of a rasterizer building system, in accordance with one embodiment of the invention.

FIG. 3 is a diagram of a rasterizer building system 300, in accordance with one embodiment of the invention. The rasterizer building system 300 is implemented on a microprocessor architecture for a processing machine. The components of the system are interfaced together with one another via software communications and hardware resources available on the processing machine.

The rasterizer building system 300 includes a token building application 310 and a composing application 320. Optionally, the rasterizer building system 300 includes a graphics application 330, an indexing application 340, and/or a rasterizer index data store 350. Further, the various components of the rasterizer building system 300 can be all local within the processing machine or have some components that are accessible over a network.

The token building application 310 takes as a desired graphical state associated with desired image attributes of an image not yet depicted on an electronic display (interfaced to the rasterizer building system 300) and image attributes for images, which may or may not be pre-existing on the electronic display. The token building application 310 scans the entire graphical state to restate, expand, or re-express the graphical state as a series of ordered processing tokens. The processing tokens define the rasterizer actions or functions that need to be performed to generate the desired graphical state.

The composing application 320 selects and acquires a shell rasterizer that can perform the processing steps defined within the tokenized data stream. Moreover, the composing application 320 scans each token of the tokenized data stream and determines whether replacement logic or memory management insertion logic is needed for a shell rasterizer. Replacement logic is subsets of logic or operations that need to be used in the shell rasterizer (for a number of any selected generic rasterizer functions) based on the architecture of the processing machine (e.g., register, processor, and memory limitations).

After a token is altered with replacement logic, memory management logic is inserted at appropriate locations within the shell rasterizer. The memory management logic ensures memory is in the proper and most efficient state before the next processing step of the shell rasterizer executes, assuming the shell rasterizer were to be actually executing. In this way, memory management logic is inserted based on the actions taken by the composing application 320 with a processing token. The composing application 320 simulates execution of any replacement logic inserted into the shell rasterizer. Moreover, the memory management logic is based on an API associated with the processing machine for managing memory and memory resources.

Once the composing application 320 completes processing each token in the tokenized data stream that represents the desired graphical state, the shell rasterizer represents a specific instance of a modified rasterizer that when executed produces the desired graphical state on the electronic display. In one embodiment, a pointer reference to the modified rasterizer is generated and returned to a graphics application 330 which initially requested the desired graphical state. The graphics application 330 can reference or access the pointer in order to execute the modified rasterizer.

In still other embodiments, a pointer to the modified rasterizer is supplied to an indexing or hashing application 340. The indexing application 340 uses the desired graphical state to index the pointer to a specific location within a rasterizer index store 350. The rasterizer index store 350 can be in RAM memory or external storage. In 350 can be permanent or temporary storage. In other words, the rasterizer index data store 350 can be supplied on an external computer-accessible medium and interfaced to a processing machine. Thus, a processing machine can define a variety of graphical states and store them on removable storage, where the storage can be re-inserted or interfaced to the machine and acquired by the indexing application 340 when needed.

Embodiments of the rasterizer building system 300 can be implemented in order to dynamically build rasterizers for a processing machine. The dynamically built rasterizer processes in a memory efficient manner based on the architectural limitations and properties of the processing machine. Moreover, the rasterizer building system 300 can be used to index and acquire rasterizers that were previously dynamically built by the rasterizer building system 300.

Figure 4:
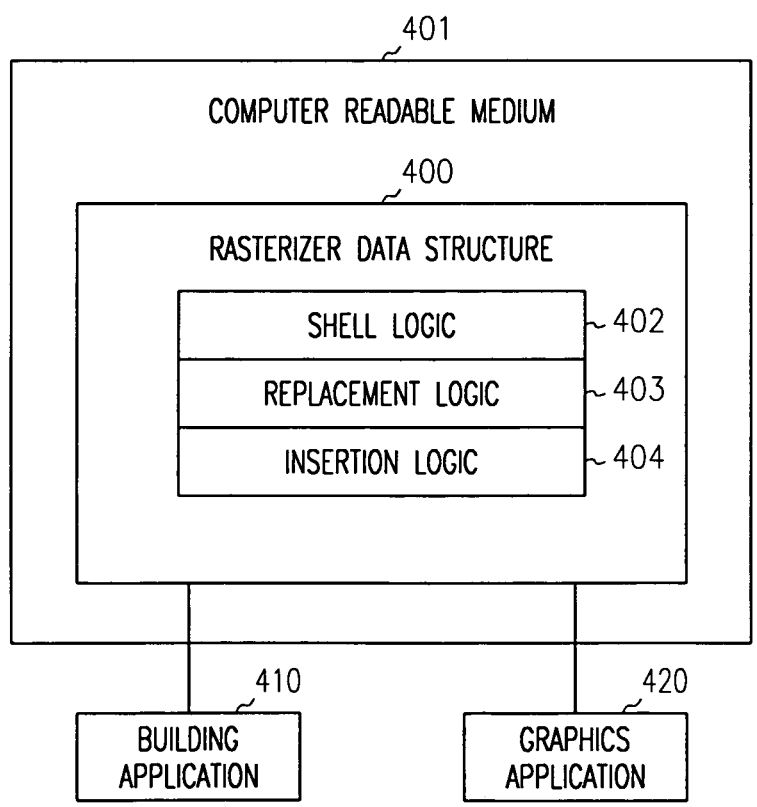
FIG. 4 is a diagram of a rasterizer data structure, in accordance with one embodiment of the invention.

FIG. 4 is a diagram of one rasterizer data structure 400, in accordance with one embodiment of the invention. The rasterizer data structure 400 resides in a computer-accessible medium 401. The data structure 400 need not reside on a single computer-accessible medium 401 and need not be prefabricated within a computer-accessible medium 401 before it is consumed. In other words, the data structure 400 can be logically and programmatically assembled for a variety of disparate computer-accessible media 401.

The rasterizer data structure 400 includes shell logic 402, replacement logic 403, and insertion logic 404. Further, the rasterizer data structure 400, when processed on a processing machine produces a desired graphical state. The rasterizer data structure 400 is produced by a building application 410 on the processing machine. Also, the rasterizer data structure is initially built by the building application 410 because a needed graphical state received from a graphics application 420 is not available within memory or storage of the processing machine when requested by the graphics application 420.

The shell logic 402 includes rasterizer functions identified in the desired graphical state. Selective portions of the rasterizer functions are altered by the replacement logic 403 based on the processing machine's architectural limitations and resources. Moreover, if replacement logic 403 is inserted into the rasterizer data structure 400, then corresponding insertion logic 404 associated with memory management logic are inserted within the rasterizer data structure 400.

The insertion or memory management logic 404 maintains a proper processing state for the rasterizer data structure 400 when it is actually processed on the processing machine. In 404 can include logic for updating memory braches, for pushing data to the processing machine's execution stack, and for popping data from the execution stack.

In one embodiment, the rasterizer data structure 400 is dynamically generated by the building application 410 when the building application 410 receives a graphical state request from the graphics application 420. In another embodiment, the rasterizer data structure 400 is prefabricated by the building application 410 and made accessible to the processing machine via memory or storage (local or removable). The specific instance of the rasterizer data structure 400 is determined by the requested graphical state and the architecture of the processing machine.

Further in some embodiments, the rasterizer data structure 400 can be consumed through accessing a pointer to the rasterizer data structure 400. The pointer can be indexed or hashed into another data structure based on a location associated with the desired graphical state.

Embodiments of this invention permit microprocessor architectures with limited memory and processing resources to benefit from quality image processing associated with rasterizers. These rasterizers are dynamically assembled from subsets of logic that are assembled based on the memory limitations and resources of the microprocessor machines. Conventionally, rasterizer processing has had only limited availability on a variety of microprocessor architectures having limited resources. However, now these architectures (e.g., PDAs, cell phones, intelligent appliances, and others) can benefit with the embodiments and teachings of this invention.

The above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method comprising:
    assembling tokens that define processing for producing a graphical state;
    assembling a shell rasterizer using the tokens;
    selectively modifying portions of the shell rasterizer with replacement logic; and
    selectively inserting memory management logic into portions of the shell rasterizer to produce a modified rasterizer.

2. The method of claim 1 further comprising associating a pointer reference to a location of the modified rasterizer in a hash table, wherein the pointer reference is hashed based on the graphical state.

3. The method of claim 1 further comprising returning a pointer reference after a subsequent request is received for the graphical state.

4. The method of claim 1 wherein selectively modifying the portions further comprises determining a machine architecture that processes the method in order to select the portions.

5. The method of claim 1 wherein selectively inserting the memory management logic includes inserting the memory management logic based on simulated memory states for an executing shell rasterizer.

6. The method of claim 5 wherein selectively inserting the memory management logic further includes inserting the memory management logic using a memory interface associated with memory management for a machine architecture that processes the method.

7. A method comprising:
selectively replacing rasterizer logic in a rasterizer based on an architecture of a machine that processes the rasterizer;
selectively inserting memory management logic into the rasterizer using properties of the architecture; and
indexing the modified rasterizer in memory.

8. The method of claim 7 wherein selectively replacing rasterizer logic includes varying the rasterizer logic based on the properties and a graphical state.

9. The method of claim 7 wherein selectively inserting the memory management logic includes selecting the memory management logic based on simulating the execution of the rasterizer on the architecture.

10. The method of claim 7 wherein selectively inserting the memory management logic includes adding pushing and popping instructions for adding and removing portions of the memory management logic from a stack.

11. The method of claim 7 wherein indexing the rasterizer includes hashing a pointer reference to the rasterizer, wherein the pointer reference is hashed based on a graphical state associated with the rasterizer.

12. The method of claim 7 further comprising returning the modified rasterizer or a pointer reference to the modified rasterizer after a request for the modified rasterizer is received.

13. An article having a machine accessible medium having associated instructions, wherein the instructions, when executed, produce a rasterizer, the machine comprising at least one component performing:
assembling a shell rasterizer from a provided graphical state;
modifying the shell rasterizer with replacement logic and memory management logic to produce a modified rasterizer; and
indexing the modified rasterizer based on the provided graphical state.

14. The article of claim 13 wherein the instructions further comprise flushing memory used for producing the modified rasterizer after indexing the rasterizer.

15. The article of claim 13 wherein the instructions further comprise selecting the replacement logic and the memory management based on properties of an architecture for the machine and the provided graphical state.

16. The article of claim 13 wherein the instructions further comprise acquiring the replacement logic from a library of routines associated with performing rasterizer operations.

17. The article of claim 13 wherein the instructions further comprise acquiring the memory management logic based on an application programming interface (API) library associated with a memory stack of a machine.

18. A system, comprising:
a token building application that assembles a processing order needed to produce a graphical state; and
a composing application that assembles a generic shell rasterizer to satisfy the processing order;
wherein the composing application also dynamically replaces and inserts logic into the shell rasterizer to produce a modified rasterizer.

19. The system of claim 18 further comprising an indexing application for associating the graphical state with a pointer reference to a location of the modified rasterizer.

20. The system of claim 18 wherein the composing application uses replacement logic selected for a specific machine architecture.

21. The rasterizer building system of claim 18 wherein the composing application uses insertion logic selected based on a stack interface associated with a machine architecture.

22. A data structure residing in a computer-accessible medium for producing a rasterizer image, the data structure comprising:
shell logic produced from a graphical state;
replacement logic that selectively replaces portions of the shell logic based on an architecture of a machine that will process the data structure; and
insertion logic that is selectively intertwined into the shell logic to perform memory management when the rasterizer data structure is processed.

23. The data structure of claim 22 wherein the data structure is dynamically generated on the machine after the graphical state is detected.

24. The data structure of claim 22 wherein the data structure is prefabricated and made accessible on the machine based on the graphical state and the machine.

25. The data structure of claim 22 wherein a reference to the data structure is indexed based on the graphical state.

* * * * *